(12) United States Patent
Boglio et al.

(10) Patent No.: US 12,385,572 B2
(45) Date of Patent: Aug. 12, 2025

(54) WHOLE HOME WATER MANAGEMENT SYSTEM

(71) Applicant: CULLIGAN INTERNATIONAL COMPANY, Rosemont, IL (US)

(72) Inventors: Eugene Boglio, Glendale Heights, IL (US); Tedd M. Schneidewend, Glen Ellyn, IL (US); Christopher G. Harris, Highland Park, IL (US); Doug Anderson, St. Charles, IL (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 0 days.

(21) Appl. No.: 18/046,015

(22) Filed: Oct. 12, 2022

(65) Prior Publication Data

US 2023/0124213 A1    Apr. 20, 2023

Related U.S. Application Data

(60) Provisional application No. 63/262,670, filed on Oct. 18, 2021.

(51) Int. Cl.
  *F16K 31/04*    (2006.01)
  *C02F 5/00*    (2023.01)

(52) U.S. Cl.
  CPC ............... *F16K 31/04* (2013.01); *C02F 5/00* (2013.01); *C02F 2201/005* (2013.01)

(58) Field of Classification Search
  CPC ....... F16K 31/04; C02F 5/00; C02F 2201/005
  See application file for complete search history.

(56) References Cited

U.S. PATENT DOCUMENTS

| 4,313,825 | A | * | 2/1982 | Fleckenstein | ............ B01J 49/85 |
| | | | | | 210/138 |
| 5,568,825 | A | | 10/1996 | Faulk | |
| 6,343,746 | B2 | | 2/2002 | Chamot et al. | |
| 6,681,805 | B2 | | 1/2004 | McLane et al. | |
| 6,696,963 | B2 | | 2/2004 | Zimmerman et al. | |

(Continued)

FOREIGN PATENT DOCUMENTS

| CN | 205838697 U | 12/2016 |
| CN | 207030984 U | 2/2018 |
| WO | 2020120975 A1 | 6/2020 |

OTHER PUBLICATIONS

International Search Report and Written Opinion received for PCT/US2022/046223, mailed Feb. 14, 2023.

*Primary Examiner* — Paul J Gray
(74) *Attorney, Agent, or Firm* — Greer, Burns & Crain, Ltd

(57) ABSTRACT

A valve for a water system including a water supply conduit, the valve having a valve housing that defines a valve inlet and valve outlet. The valve inlet is connected to the water conduit and at least one piston is disposed within the valve housing and is configured to direct flow within the valve. A motor associated with the valve housing is operably attached to the piston and is further configured for driving the piston between a service position, a bypass position, and a shutoff position. The valve further includes at least one sensor associated with the valve inlet or valve outlet for monitoring a water condition. A control system receives data from the at least one sensor and is configured for actuating the motor between the service position, the bypass position, and the shutoff position in response to the data.

14 Claims, 6 Drawing Sheets

(56) References Cited

U.S. PATENT DOCUMENTS

| | | |
|---|---|---|
| 7,030,767 B2 | 4/2006 | Candela |
| 7,592,921 B2 | 9/2009 | Young |
| 7,610,931 B2 | 11/2009 | Wittig et al. |
| 8,535,540 B2 | 9/2013 | Chandler, Jr. |
| 8,709,241 B2 | 4/2014 | Dopslaff et al. |
| 9,714,715 B2 | 7/2017 | Chandler, Jr. et al. |
| 9,857,805 B2 | 1/2018 | Halimi |
| 9,970,558 B1 | 5/2018 | Chandler, Jr. et al. |
| 10,011,500 B1 | 7/2018 | Chandler, Jr. et al. |
| 10,494,268 B1 | 12/2019 | Chandler, Jr. et al. |
| 10,822,251 B1 | 11/2020 | Chandler, Jr. et al. |
| 10,829,388 B1 * | 11/2020 | Chandler, Jr. .......... F16K 11/22 |
| 10,865,123 B1 | 12/2020 | Chandler, Jr. et al. |
| 10,962,993 B2 | 3/2021 | Halimi |
| 2009/0123340 A1 | 5/2009 | Knudsen et al. |
| 2017/0362101 A1 | 12/2017 | Zhan et al. |
| 2020/0354929 A1 | 11/2020 | Tasser |
| 2021/0024382 A1 * | 1/2021 | Tally ..................... B01D 61/08 |

* cited by examiner

WHOLE HOME WATER MANAGEMENT SYSTEM

RELATED APPLICATION

The present application is a Non-Provisional of, and claims 35 USC 119 priority from, U.S. Provisional Application Ser. No. 63/262,670 filed Oct. 18, 2021, the contents of which are incorporated by reference herein.

BACKGROUND

The present invention relates to a home water system, and specifically such a system including a valve, preferably a bypass valve that is automatically adjustable in response to water flow conditions for preventing damage due to in-home water leaks.

Bypass valves are known in the art for use with water treatment systems such as water softeners and water filters. Typically, bypass valves are manually operated from a service position to a bypass position to supply untreated water when the water treatment system requires maintenance or when treated water is unavailable, for example when the water softener is in the regeneration cycle.

A known problem in home water systems is that home water systems may periodically experience leaks, typically through breaks in house piping or because of defects in appliances such as water heaters, toilets or faucets or the like. These leaks are difficult to detect and often cause significant damage to personal property and, in some cases, the structure of the home, prior to detection. Such leaks occur regardless of whether known bypass valves are in service position or bypass position.

A problem of the above-mentioned technology is that known devices and valves cannot simply and efficiently monitor in-home water conditions and shutoff water supply to the home water system if necessary. As such, there is a need for a better way to identify leaks in home water systems before significant damage is done.

SUMMARY

The above-listed need is met or exceeded by the present valve for a home water system. While the present valve is preferably a bypass valve, the use of other water system valves are contemplated. A feature of the present bypass valve is a motor operably attached to an internal piston and in communication with a valve control system. The piston is moveable between a service position, a bypass position, and a shutoff position. At least one sensor is in communication with the control system, and is configured for collecting patterns of normal water use in the residence. In response to the stored sensor data, the control system actuates the piston. As such, the bypass valve can automatically move the piston between the service position, the bypass position, and the shutoff position in response to water flow conditions. A noted feature is that unusual water usage, or reduction in water flow or pressure, indicating a leak, will cause the control system to actuate the motor to move the piston to the shutoff position. In such a scenario, water damage through leakage is reduced. Another advantage of the present bypass valve is that it is readily connectable with conventional water softeners.

More specifically, a valve for a water system is provided including a water supply conduit. The valve includes a valve housing that defines a valve inlet, which is connected to the water conduit, and a valve outlet. In the preferred embodiment, at least one piston disposed within the valve housing directs flow within the valve. Additionally, the valve includes a motor associated with the valve housing and operably attached to the piston. Preferably, the motor drives the piston between a service position, a bypass position, and a shutoff position. At least one sensor is also provided and is associated with at least one of the valve inlet and valve outlet for monitoring a water condition. Preferably, a control system receives data from the at least one sensor and actuates the motor between the service position, the bypass position, and the shutoff position in response to the data.

In the preferred embodiment, the valve housing further defines a softener inlet and a softener outlet. The softener inlet opposes and is aligned with the valve inlet. Likewise, the softener outlet opposes and is aligned with the valve outlet. Preferably, the water system further includes a water treatment system, and the softener inlet and softener outlet are in fluid connection with the water treatment system.

In an embodiment, the valve housing further defines a bypass chamber having a bypass chamber inlet and a bypass chamber outlet. When the piston is in the bypass position, the bypass chamber permits flow through the bypass valve.

In the preferred embodiment, the piston further includes an inlet passage associated with the valve inlet and an outlet passage associated with the valve outlet. The inlet passage and outlet passage allow for water flow through the piston. The piston also includes an inlet blocking portion and an outlet blocking portion. Preferably, the inlet blocking portion blocks and prevents flow in the valve inlet in the shutoff position, the softener inlet in the bypass position, and the bypass inlet in the service position. Similarly, the outlet blocking portion blocks and prevents flow in the valve outlet in the shutoff position, the softener outlet in the bypass position, and the bypass outlet in the service position.

A control housing is mounted to the valve housing, and the control system is disposed within the control housing. Preferably, the at least one sensor is taken from the group including a flow meter, a pressure sensor, a temperature sensor, and a TDS sensor.

Preferably, the at least one sensor includes a flow meter. In an embodiment, the control system alerts a user or actuates the piston to the shutoff position when the flow meter detects a predetermined flow rate. Alternately, the flow meter is configured for measuring a predetermined flow rate for a predetermined amount of time. Ultrasonic flow meters are contemplated.

In an embodiment, the at least one sensor also includes a temperature sensor. The control system alerts a user or actuates the piston to the shutoff position when the temperature sensor detects a predetermined temperature.

In another embodiment, the at least one sensor includes a total dissolved solids (TDS) sensor. According to this embodiment, the control system alerts a user or actuates the piston to the shutoff position when the TDS sensor detects a predetermined dissolved solids concentration.

In a preferred embodiment, the sensors are TDS or conductivity sensors—one located at or near the inlet to the valve, and one located at or near the outlet of the valve. Conductivity variation is used to assess the efficacy of the softener or filter. For example, the influent (high iron) water, entering an iron reduction filter, conventionally has a different conductivity than the effluent water. Such readings indicate whether the filter is working properly, or if the filtration media needs to be changed. Similarly, differences in conductivity are assessed of influent and effluent water from a water softener to determine whether it is working properly.

In another embodiment, the at least one sensor further includes an inlet pressure sensor associated with the valve inlet and an outlet pressure sensor secured in the valve outlet. Here, the control system detects leaks in the water system using data from the inlet pressure sensor or the outlet pressure sensor and alerts a user or actuates the piston when a leak is detected.

In a preferred embodiment, the inlet and outlet pressure sensors are used in combination to measure the pressure differential. This process is especially useful for multi-media filters to signal when the media is loaded (increased pressure differential) and the filters need to be backwashed.

In the preferred embodiment, the control system further sends and receives signals from the Cloud. A user communicates with the Cloud from a user device. Using the user device, the user actuates the piston of the bypass valve between the service position, the bypass position, and the shutoff position.

Preferably, the bypass valve includes a handle attached to the valve housing. The handle can manually move the piston between the service position, the bypass position, and the shutoff position.

In another embodiment, the present valve is connected to the control system and includes remote sensors for monitoring temperature, leaks, water flow and the like, which are installed in other areas of the house and are configured for communicating with the main control system and the valve.

In another embodiment, remote and/or otherwise isolated valves, such as shutoff valves located in other areas of the house, such as adjacent to appliances, are connected to the present valve and in communication with the control system. The above-described remote sensors, used on combination with the remote valves, enable isolation of sections of the home water system for tracking, locating, identifying leaks or flow problems and isolating parts of the home water system.

In an embodiment, the main valve is connected to the inlet pressure sensor and the control system, so that the pressure sensor is configured for sensing elevated pressures above the rated working pressure of water softeners, filters or other appliances, and the control system shuts off the valve for protecting the appliances from exposure to excessive pressures.

In another embodiment the valve housing is provided with connection ports for the addition of components including pressure gage, water sample taps, fittings for the routing of treated water to other systems, including but not limited to a point of use Reverse Osmosis (RO) unit or the like.

DETAILED DESCRIPTION

Figure 1:
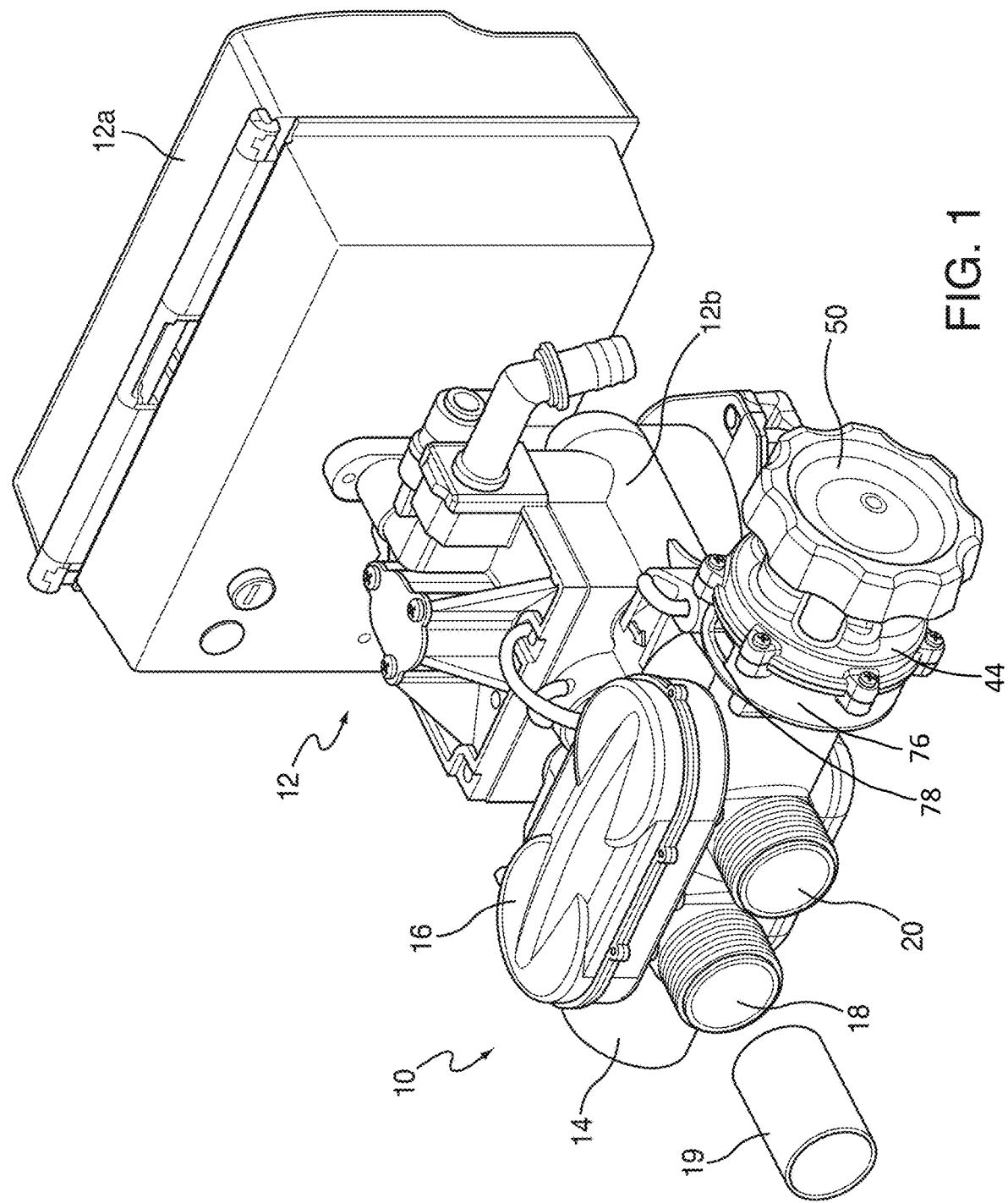
FIG. 1 is a fragmentary, top perspective view of the present water system including the present bypass valve.
Figure 2:
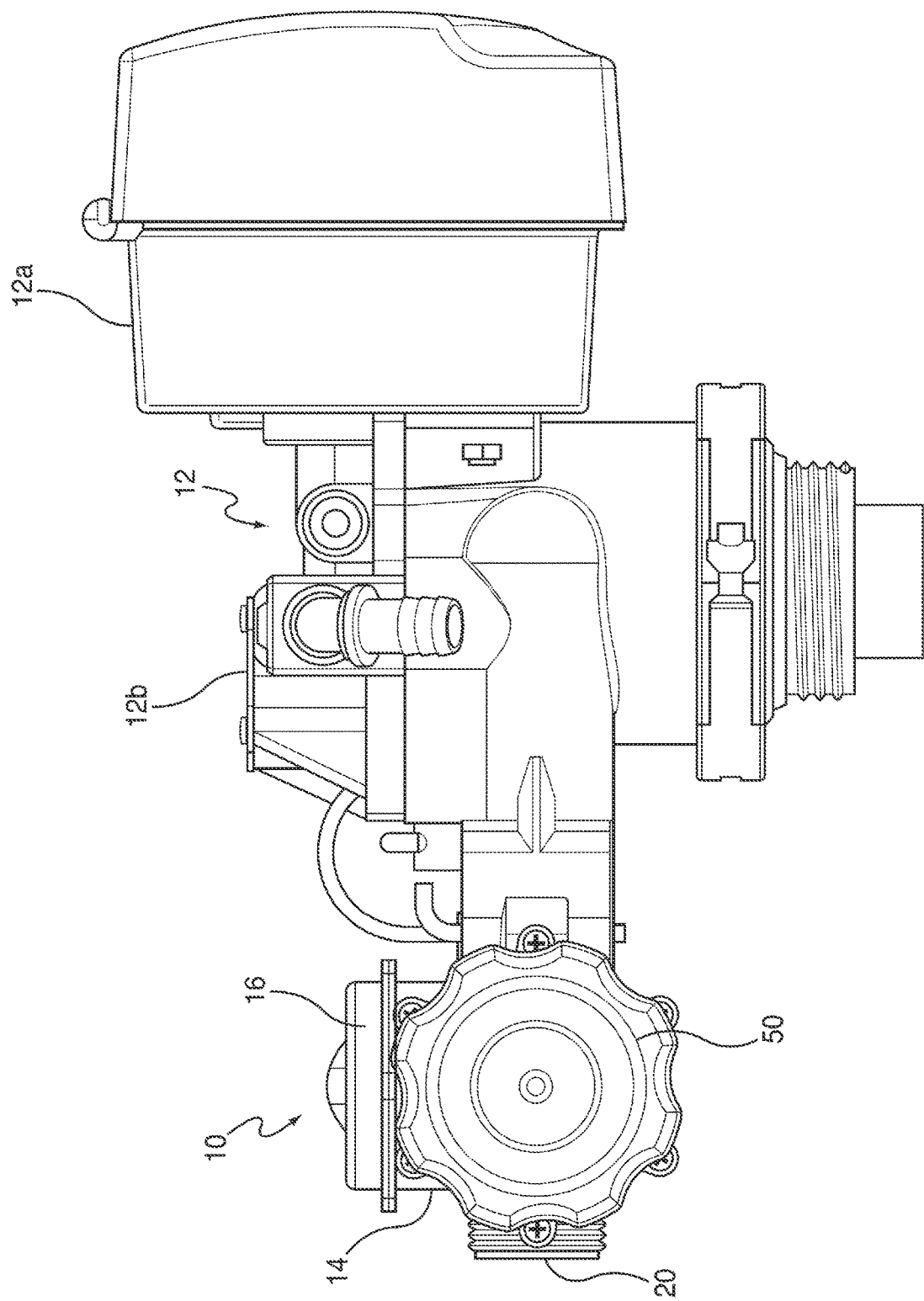
FIG. 2 is a fragmentary side view of the present water system including the present bypass valve.
Figure 3:
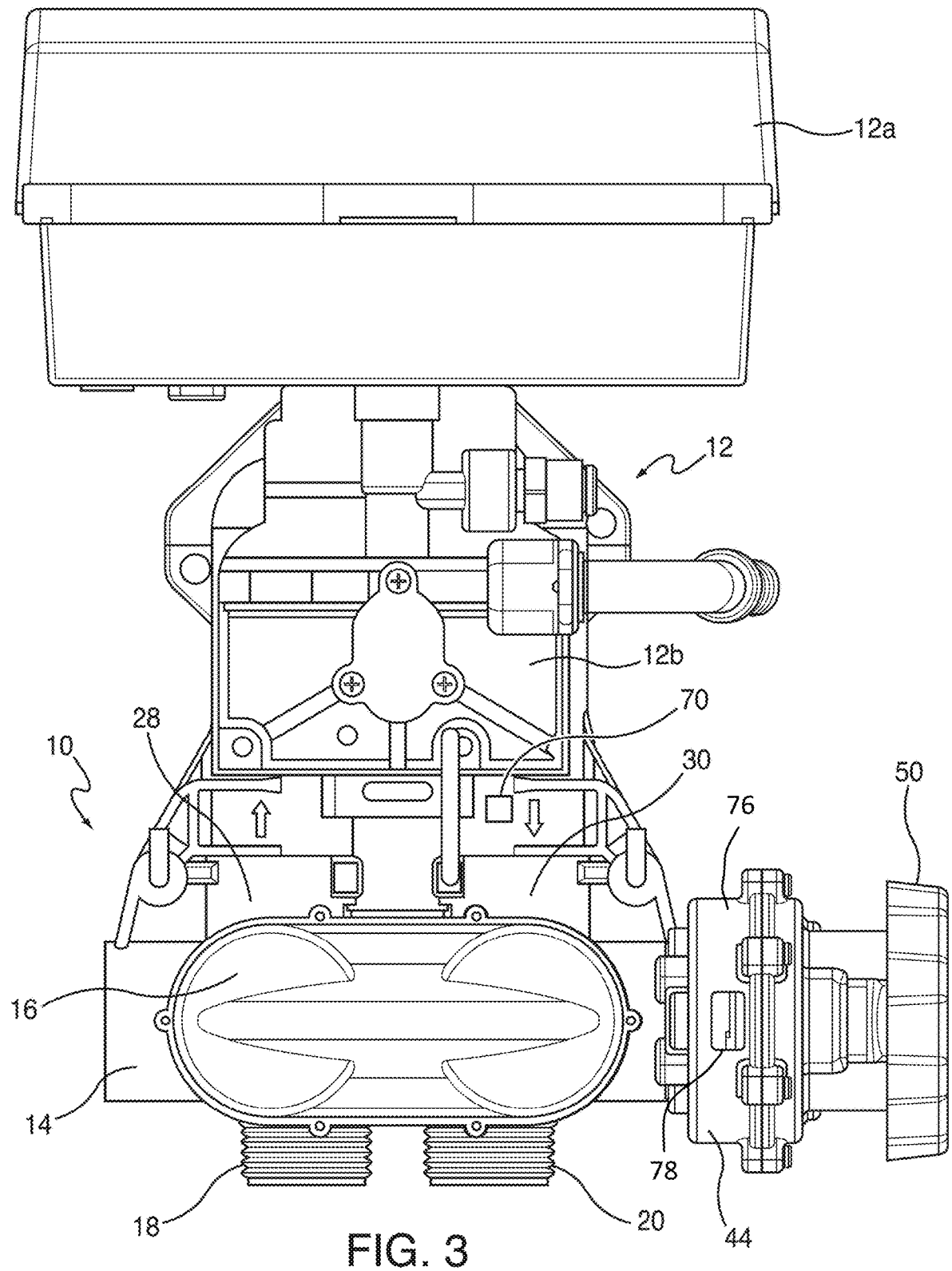
FIG. 3 is a top view of the present water system including the bypass valve of FIG. 1.

Referring now to FIGS. 1-3, a valve is generally designated 10 and is shown connected to a water treatment system, generally designated 12. In the preferred embodiment, the water treatment system 12 is a water softener, but it is contemplated that the system may include other types of water treatment or filtration apparatus, including multiple treatment units. Included in the water treatment system 12 is a system controller and interface 12a and a system control valve 12b, distinct from the present bypass valve 10.

Referring now to FIGS. 1-6, the valve 10, preferably a bypass valve, includes a valve housing 14 and a control housing 16 mounted to the valve housing. Preferably, the valve housing 14 is of a generally cylindrical shape, and further defines a valve inlet 18 receiving water from a water supply conduit 19 and a valve outlet 20 horizontally aligned with and adjacent to the valve inlet 18. A bypass chamber 22 is also defined by the valve housing 14 and includes a bypass chamber inlet 24 proximate to and opposing the valve inlet 18 and a bypass chamber outlet 26 proximate to and opposing the valve outlet 20. It is contemplated that the present valve 10 is configured for being retrofitted into existing water treatment systems 12 designed for conventional bypass valves not including the features described here.

Additionally, the valve housing 14 defines a softener inlet 28 aligned with and opposing the valve inlet 18, and a softener outlet 30 aligned with and opposing the valve outlet 20. The softener inlet 28 and softener outlet 30 are best seen in FIG. 3, and direct flow into and out of the water treatment system 12. Additionally, the softener inlet 28 and softener outlet 30 are designed and sized such that they are compatible with a broad variety of water treatment and filtration devices and systems.

Figure 5:
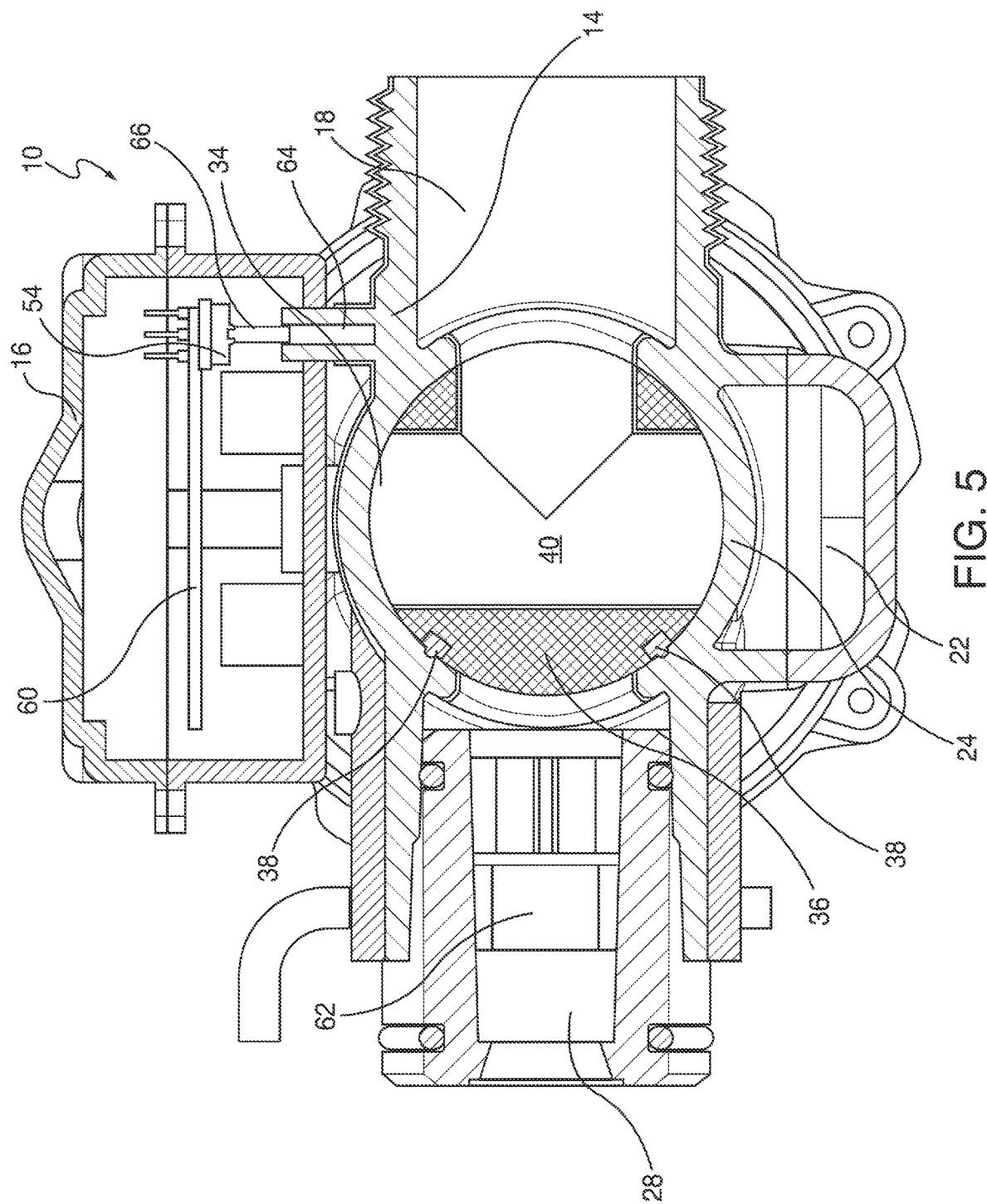
FIG. 5 is a cross section taken along line 5-5 of FIG. 4 and in the direction generally indicated.
Figure 6:
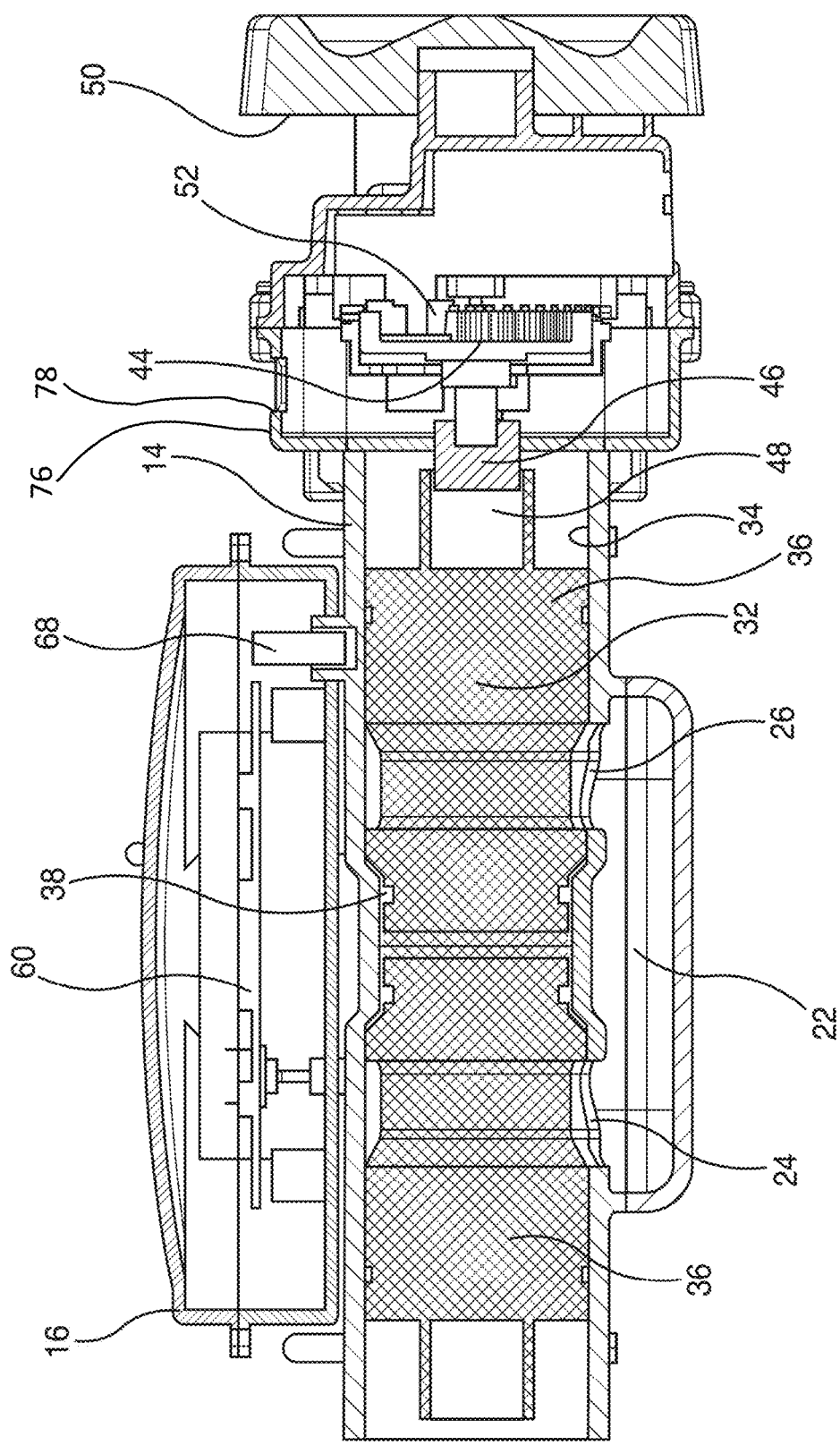
FIG. 6 is a cross section taken along line 6-6 of FIG. 4 and in the direction generally indicated.

Referring to FIGS. 5 and 6, within the valve housing 14, at least one valve piston 32 is rotatably secured within a valve chamber 34 and, through rotation, operably moves between a service position, a bypass position, and a shutoff position. It will be understood that in the present application, "piston" refers broadly to any valve controlling or flow directing element, including but not limited to balls, More specifically, the piston 32 is generally cylindrical and includes a flow blocking portion 36 that is "D"-shaped in cross-section (FIG. 5). The flow blocking portion 36 is configured to rotate in the valve chamber 34 and selectively block the bypass chamber inlet 24 in the service position, the softener inlet 28 in the bypass position (Shown in FIG. 5), and the valve inlet 18 in the shutoff position. Since the valve 10 controls flow out of two ports, 18 20, the piston 32 is symmetrical and the there are two flow blocking portions 36, one for each of the ports 18, 20. Each flow blocking portion 36 is provided with an elastic sealing element or O-rings 38 to prevent leaking. Best seen in FIG. 5, the piston 32 further includes a flow-through service passage 40 and a bypass passage 42 for controlling flow through the valve 10 depending on the rotational position of the piston.

In order to actuate the piston 32 between these positions, a motor 44 is secured within the valve housing 14 and drives the rotation of the piston 32. In the preferred embodiment, the motor 44 is geared and selected in relation to the size of the bypass chamber 22 and flow specification of the home water system 12. Also, the motor 44 drives the piston 32 via a hex, or otherwise faceted or non-circular connector fitting 46 which matingly engages a socket 48 in the piston 32.

In the service position, water flows through the valve inlet 18 into the flow through service passage 40, and into the water treatment system 12 through the softener inlet 28, out of the water treatment system 12 through the softener outlet 30, and finally out of the bypass valve 10 through the valve outlet 20. In the bypass position, the piston 32 is positioned such that water flows into the valve inlet 18, through the bypass chamber 22, and out of valve outlet 20. In the bypass position, water does not flow through the water treatment system 12. Finally, in the shutoff position, the piston 32 is rotated to a position such that water is blocked by the flow blocking portion 36 from entering the valve inlet 18. Thus, no water flows though the bypass valve 10 and water flow into the home water management system downstream of the bypass valve 10 is prevented when the piston 32 is in the shutoff position.

Another feature of the bypass valve 10 is a manual handle 50, which is operably engaged with a motor clutch system 52 that allows override of the motor 44. The handle 50 is used to manually move the piston 32 between the service position, the bypass position, and the shutoff position, for example, in situations where the motor is inoperative, or when there is a power outage. The clutch system 52 is geared to allow for lower torque operation of handle 50 by the user.

In the preferred embodiment, a control system 60 is housed within the control housing 16 and includes a programmable chip and suitable programming so that the system 60 is configured to monitor, record and compare data provided by several sensors that monitor the properties and characteristics of the water and flow in the bypass valve 10 and throughout the home water system. Using lookup-tables, the control system 60 develops patterns of water flow and usage data. To protect the control system 60, the control housing 16 is sealed to prevent moisture from entering the control housing 16 and allow for outdoor installation. The control system 60 is in communication with the motor 44 and signals the motor to move the piston 32 in the bypass valve 10 between the service position, bypass position, and shutoff position. The control system 60 further sends signals to and receives signals from the Cloud.

Best seen in FIG. 5, at least one flow meter 62 is included in the bypass valve 10, preferably in at least one of the valve inlet 18, the valve outlet 20, the bypass inlet 24 or the bypass outlet 26. Multiple flow meters 62 are optionally included in the bypass valve 10 to measure and compare the water flow rate at different parts of the home water management system 12. It is contemplated that the flow meter is optionally a mechanical flow meter, such as a turbine flow meter, an ultrasonic flow meter, or any other type of flow meter known in the art. The flow meter 62 is used for measuring and tracking flow rate in the home and can be used to detect leaks and unwanted water flow in the home water management system. Further, the flow meters 62 are used to track the total cumulative flow into the home water management system over predetermined a period of time. Alternately, the flow meter is configured for measuring a predetermined flow rate for a predetermined amount of time.

Pressure sensors 64 (FIG. 5) are further disposed in operational relationship to both the valve inlet 18 and the valve outlet 20. Preferably, the pressure sensors 64 are used to detect leaks, particularly small leaks, in both the water treatment system 12, the bypass valve 10, and the entire water system, for example the water system of a home. To detect leaks in the water treatment system 12, the control system 60 measures the pressure drop across the bypass valve 10 inlet 18 and the outlet 20. To detect leaks in the entire water system, flow to the valve inlet 18 is shut off and the control system 60 measures the pressure decay of pressure sensors 64 over a period of time. The control system 60 also uses the same process to detect leaks in the water treatment system 12 by comparing the data between the pressure sensor 64 in the valve inlet 18 and the pressure sensor 64 in the valve outlet 20. In an embodiment, inlet and outlet pressure sensors 64 are used in combination, connected to the control system 60 to measure the pressure differential between them so that appropriate appliance pressure values are maintained.

The bypass valve 10 is also provided with a temperature sensor 66 to detect water temperature. If the temperature of the water approaches the freezing point, the control system 60 alerts the user and moves the bypass valve 10 to shutoff position. Alternatively, the control system 60 is optionally configured for alerting the user of a low water temperature. In such cases, the user chooses whether to instruct the control system 60 to move the bypass valve 10 to the shutoff position.

Referring again to FIG. 6, a position sensor 68 is included in the control housing 16, is connected, as are all the sensors, to the control system 60, and is positioned proximate the piston 32 such that the position sensor 68 monitors the position of the piston 32. The position sensor 68 is preferably a magnetic or optical sensor, but may be any other position sensor known in the art. The control system 60 detects whether the bypass valve 10 is in the service position, the bypass position, or the shutoff position using the position sensor 68.

Referring now to FIG. 3, the bypass valve 10 further includes a total dissolved solids (TDS) sensor 70 located in the softener outlet 30 or valve outlet 20 for measuring the concentration of dissolved solids in the water. The TDS sensor 70 is used to estimate water hardness and evaluate the performance of the water softener. For example, if high levels of mineral concentration are detected by the TDS sensor 70, the control system 60 alerts the user that maintenance is needed on the water treatment system 12. The user then optionally chooses whether to instruct control system 60 to move the bypass valve 10 to the bypass position or the shutoff position.

In one embodiment a pair of TDS sensors, alternately conductivity sensors 70 are provided, one located at or near the inlet 18 to the valve 10, and one located at or near the outlet 20 of the valve. Conductivity variation is used to assess the efficacy of the softener or filter 12. For example, the influent (high iron) water, entering an iron reduction filter, conventionally has a different conductivity than the effluent water. Such readings indicate whether the filter is working properly, or if the filtration media needs to be changed. Similarly, differences in conductivity are assessed of influent and effluent water from a water softener to determine whether it is working properly.

In another embodiment, the present valve 10 is connected to the control system 60 and includes remote sensors similar to those designated 64, 66, 68 for monitoring temperature, leaks, water flow and the like, which are installed in other areas of the house and are configured for communicating with the main control system 60 and the valve 10.

In an embodiment, remote and/or otherwise isolated valves, such as shutoff valves located in other areas of the house, such as adjacent to appliances, are connected to the present valve 10 and in communication with the control system 60. The above-described remote sensors, used in combination with the remote valves, enable isolation of sections of the home water system for tracking, locating, identifying leaks or flow problems and isolating parts of the home water system.

In an embodiment, the main valve 10 is connected to the inlet pressure sensor 64 and the control system 60, so that the pressure sensor is configured for sensing elevated pressures above the rated working pressure of water softeners, filters or other appliances, and the control system 60 shuts off the valve 10 for protecting the appliances from exposure to excessive pressures.

In another embodiment the valve housing 14 is provided with connection ports (not shown) for the addition of components including pressure gage, water sample taps, fittings for the routing of treated water to other systems, including but not limited to a point of use Reverse Osmosis (RO) unit or the like.

Figure 4:
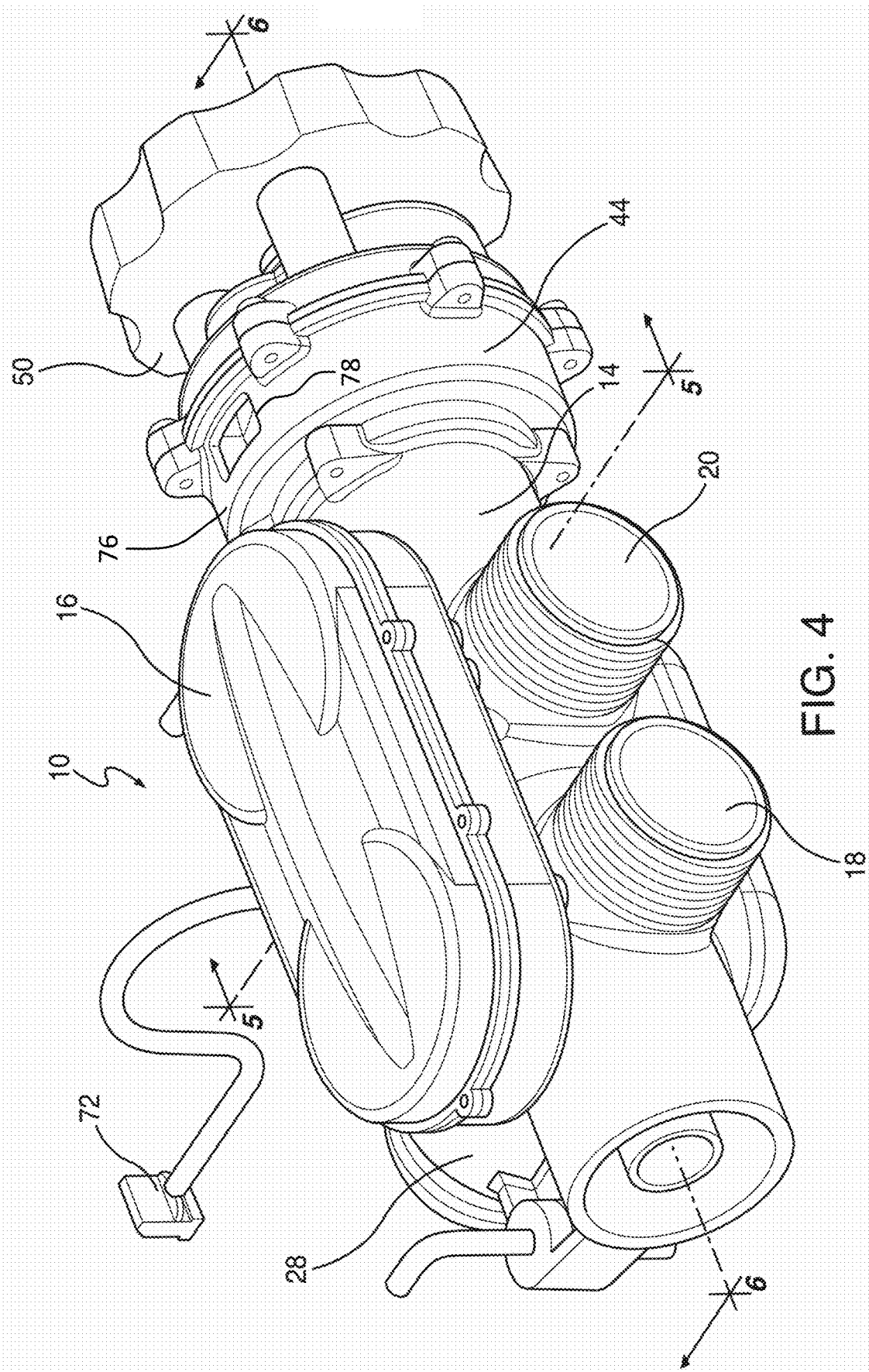
FIG. 4 is a top perspective view of the present bypass valve.

Additionally, the control system 60 receives instructions from a user or remote device and executes commands. For example, the control system 60 optionally automatically moves the bypass valve 10 to the shutoff position if a leak is detected, or if the water temperature is close to freezing. Alternatively, the control system 60 optionally alerts the user of an unusual flow pattern, a leak, a low water temperature, a total dissolved solids (TDS) value, or any other programmed condition or property of the water or management system. In response, the user optionally instructs the control system 60 to execute a command. For example, if a small leak is detected in the water softener, the control system 60 alerts the user. The user then instructs the control system 60 to move the bypass valve 10 to bypass position. Referring now to FIG. 4, the control system 60 is preferably equipped with a data connector or a data port 72 for a communication cable for connecting the control system to the user's computer (not shown) or ultimately, the Internet. Wireless connections are also contemplated. It is also contemplated that the data connector or data port 72 is usable with "multi-tank" systems in which the valves are interconnectable and communicate with each other or with other equipment.

As the control system 60 collects data from the system, the bypass valve 10 also includes the option to track and learn water tendencies of the home. For example, the bypass valve 10 detects the total water usage of different home appliances. Additionally, the control system 60 recognizes the difference between various water flow profiles, appliance usage, flow to and from tubs, showers, sinks, irrigation systems, or leaks in the home water system.

Returning now to FIGS. 1, 3, 4 and 6, the motor 44 has a housing 76 that defines an aperture 78.

While a particular embodiment of the present bypass valve has been described herein, it will be appreciated by those skilled in the art that changes and modifications may be made thereto without departing from the invention in its broader aspects and as set forth in the following claims.

The invention claimed is:

1. A bypass valve for a water system including a water supply conduit and a system control valve, said bypass valve comprising: a bypass valve housing separate from the system control valve and defining a bypass valve inlet and a bypass valve outlet, said bypass valve inlet connected to the water conduit upstream from the system control valve; at least one piston disposed within said valve housing and configured to direct flow within said valve; a motor associated with said valve housing and operably attached to said piston, said motor further configured for driving said piston exclusively between a service position, a bypass position, and a shutoff position; at least one sensor associated with one of said bypass valve inlet and said bypass valve outlet for monitoring a water condition; a control system receiving data from said at least one sensor, said control system configured for actuating said motor only between the service position, the bypass position, and the shutoff position in response to said data; and a handle being external to and attached to said valve housing through connection between said handle and said motor, and being configured so that said handle is connected to a motor clutch system which, in turn is connected to said piston for manual movement of said piston by said handle between the service position, the bypass position, and the shutoff position.

2. The valve of claim 1, wherein said valve housing defines a softener inlet and a softener outlet,
   said softener inlet opposing and aligned with said valve inlet, and said softener outlet opposing and aligned with said valve outlet;
   wherein the water system includes a water treatment system; and
   wherein said softener inlet and said softener outlet are configured for fluid connection with said water treatment system.

3. The valve of claim 2, wherein said valve housing defines a bypass chamber having a bypass chamber inlet and a bypass chamber outlet;
   said bypass chamber permitting flow through said valve when said piston is in the bypass position.

4. The valve of claim 3, wherein said piston further includes:
   an inlet passage associated with said valve inlet and an outlet passage associated with said valve outlet, said inlet passage and said outlet passage configured to allow flow through said piston, and
   an inlet blocking portion and an outlet blocking portion, said inlet blocking portion configured to block flow from said valve inlet in the shutoff position, said softener inlet in the bypass position, and said bypass inlet in the service position, and said outlet blocking portion configured to block flow from one of said valve outlet in the shutoff position, said softener outlet in the bypass position, and said bypass outlet in the service position.

5. The valve of claim 1, further comprising a control housing mounted to said valve housing, said control system disposed within said control housing.

6. The valve of claim 1, wherein said at least one sensor is taken from the group including a flow meter, a pressure sensor, a temperature sensor, and a TDS sensor.

7. The valve of claim 1, wherein said at least one sensor is a flow meter, and
   said control system is configured to alert a user or actuate said piston to said shutoff position when said flow meter detects at least one of a predetermined flow rate and a predetermined flow rate for a predetermined amount of time.

8. The valve of claim 1, wherein said at least one sensor is a temperature sensor, and
   said control system is configured to alert a user or actuate said piston to said shutoff position when said temperature sensor detects a predetermined temperature.

9. The valve of claim 1, wherein said at least one sensor is a total dissolved solids (TDS) sensor, and
   said control system is configured to alert a user or actuate said piston to said shutoff position when said total dissolved solids sensor detects a predetermined dissolved solids concentration.

10. The valve of claim 1, wherein said at least one sensor is an inlet pressure sensor associated with said valve inlet and an outlet pressure secured in said valve outlet, and
    said control system is configured detect a leak in the water system using data from the inlet pressure sensor or the outlet pressure sensor,
    wherein said control system alerts a user or actuates said piston when said leak is detected.

11. The valve of claim 1, wherein said control system sends and receives signals from the Cloud.

12. The valve of claim 1, wherein said motor has a motor housing has an aperture.

13. A bypass valve for a water system including a water supply conduit and a system control valve, said bypass valve comprising: a bypass valve housing separate from the system control valve and defining a bypass valve inlet and a bypass valve outlet, said bypass valve inlet connected to the water conduit upstream from the system control valve; a piston disposed within said bypass valve housing and configured to direct flow within said bypass valve; a motor associated with said valve housing and operably attached to said piston, said motor further configured for driving said piston exclusively between a service position, a bypass position, and a shutoff position; at least one TDS sensor associated with one of said bypass valve inlet and said bypass valve outlet for monitoring a water condition; a control system receiving data from said at least one sensor, said control system configured for actuating said motor only between the service position, the bypass position, and the shutoff position in response to said data; and a handle being external to and attached to said valve housing through connection between said handle and-said motor, and being configured so that said handle is connected to a motor clutch system, which in turn is connected to said piston to for manual movement of said piston by movement of said handle between the service position, the bypass position, and the shutoff position.

14. The valve of claim 13, wherein said motor has a motor housing has an aperture.

* * * * *